United States Patent
Kundu et al.

(10) Patent No.: US 12,231,548 B2
(45) Date of Patent: Feb. 18, 2025

(54) ADAPTIVE QUBIT-BASED THRESHOLD HANDSHAKING FOR QUANTUM SAFE PROTOCOLS

(71) Applicant: Cisco Technology, Inc., San Jose, CA (US)

(72) Inventors: Ashish Kundu, San Jose, CA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 18/078,223

(22) Filed: Dec. 9, 2022

(65) Prior Publication Data

US 2024/0195612 A1  Jun. 13, 2024

(51) Int. Cl.
*H04L 9/08* (2006.01)
*H04L 9/40* (2022.01)

(52) U.S. Cl.
CPC .......... *H04L 9/0852* (2013.01); *H04L 9/0816* (2013.01); *H04L 63/02* (2013.01); *H04L 63/029* (2013.01); *H04L 63/0464* (2013.01)

(58) Field of Classification Search
None
See application file for complete search history.

(56) References Cited

U.S. PATENT DOCUMENTS

| | | | |
|---|---|---|---|
| 7,853,020 B2 | 12/2010 | Beal et al. | |
| 9,692,595 B2 | 6/2017 | Lowans et al. | |
| 9,923,923 B1 * | 3/2018 | Sharifi Mehr | H04L 63/0428 |
| 10,091,170 B2 * | 10/2018 | Shankar | H04L 63/062 |
| 11,240,014 B1 | 2/2022 | Maganti et al. | |
| 11,322,050 B1 * | 5/2022 | Arbajian | G09C 1/00 |
| 11,399,017 B1 * | 7/2022 | Stapleton | H04L 9/0852 |
| 11,695,796 B1 * | 7/2023 | Chen | H04L 9/0844 |
| | | | 713/151 |
| 11,736,281 B1 * | 8/2023 | Maganti | G06F 16/2219 |
| | | | 713/150 |
| 2017/0289104 A1 * | 10/2017 | Shankar | H04L 63/166 |

(Continued)

OTHER PUBLICATIONS

"Post-quantum Cryptography", online: https://www.microsoft.com/en-us/research/project/post-quantum-cryptography/, 6 pages, accessed Nov. 10, 2022, Microsoft Research.

(Continued)

*Primary Examiner* — Lashonda Jacobs-Burton
(74) *Attorney, Agent, or Firm* — BEHMKE INNOVATION GROUP LLC; James M. Behmke; James J. Wong

(57) ABSTRACT

In one embodiment, a first device in a network receives a quantum computing power metric indicative of a maximum available compute power of quantum computers. The first device receives, from a second device in the network, a listing of cryptographic suites available on the second device. The first device selects, based on the quantum computing power metric, a particular cryptographic suite from among the listing of cryptographic suites available on the second device. The first device sends, to the second device via the network, an indication that the particular cryptographic suite is to be used to encrypt and decrypt traffic exchanged between the first device and the second device.

20 Claims, 6 Drawing Sheets

(56) References Cited

U.S. PATENT DOCUMENTS

| | | | |
|---|---|---|---|
| 2020/0403978 A1 | 12/2020 | Allen et al. | |
| 2022/0101164 A1* | 3/2022 | Majumdar | G06N 10/00 |
| 2022/0182413 A1 | 6/2022 | Benson et al. | |
| 2023/0291555 A1* | 9/2023 | Berta | H04L 9/0869 |

OTHER PUBLICATIONS

"Quantum Volume", online: https://en.wikipedia.org/wiki/Quantum_volume, Oct. 22, 2022, 3 pages, Wikimedia Foundation, Inc.

"Shor's Algorithm", online: https://en.wikipedia.org/wiki/Shor%27s_algorithm, Nov. 5, 2022, 9 pages, Wikimedia Foundation, Inc.

"Post-Quantum Cryptography", online: https://en.wikipedia.org/wiki/Post-quantum_cryptography, Nov. 8, 2022, 15 pages, Wikimedia Foundation, Inc.

Huelsing, et al, "XMSS: eXtended Merkle Signature Scheme", Request for Comments 8391, May 2018, 74 pages, IETF Trust.

Alagic, et al, "Status Report on the Third Round of the NIST Post-Quantum Cryptography Standardization Process", online: https://doi.org/10.6028/NIST.IR.8413-upd1, NIST IR 8413-upd1, Jul. 2022 and Sep. 2022, 102 pages, Department of Commerce, USA.

"Post-Quantum Cryptography", online: https://csrc.nist.gov/projects/post-quantum-cryptography, Nov. 2022, 4 pages, National Institute of Standards and Technology.

Chu, et al., "Avoiding the Post-Quantum Cyber Apocalypse", online: https://www.isaca.org/resources/news-and-trends/isaca-now-blog/2021/avoiding-the-post-quantum-cyber-apocalypse, Mar. 2021, 5 pages.

Koussa, Sherif, "How to Quickly Audit Your Cryptography Usage?", online: https://www.softwaresecured.com/how-to-quickly-audit-your-cryptography-usage/, Jul. 2015, 5 pages.

"Cryptography Audit in CI", online: https://cryptosense.com/analyzer/cryptography-audit, accessed Dec. 2021, 2 pages.

"Automating Cryptography Inventory", online: https://cryptosense.com/analyzer/cryptography-inventory, accessed Dec. 6, 2021, 3 pages.

"Cryptography Inventory—Building, Maintaining and Exploiting a Useful Inventory", Whitepaper v1.0, Feb. 2020, 13 pages, Cryptosense.

"Eliminating Obsolete Transport Layer Security (TLS) Protocol Configurations", Version 1.0, National Security Agency, Cybersecurity Information, Jan. 2021, 6 pages.

"IS Auditing Procedure Evaluation of Management Controls Over Encryption Methodologies", Information Systems Audit and Control Association, Document p. 9, 2004, 7 pages.

"Quantum Computing and Post-Quantum Cryptography", pp. 21-1120, National Security Agency, Quantum Computing and Post-Quantum Cryptography, Aug. 2021, 8 pages.

Fernandez-Carames, et al., "Teaching and Learning IoT Cybersecurity and Vulnerability Assessment with Shodan through Practical Use Cases", May 2020, 25 pages, Sensors 2020, 20, 3048.

"8.4. Auditing the encryption used for FTPS, SFTP, SCP and HTTPS connections", online: https://www.sftpplus.com/documentation/sftpplus/latest/guides/connection-security-audit.html, accessed Dec. 6, 2021, 3 pages.

"Actionable and Automated CryptographyThanks to Cryptosense!", online: https://www.venafi.com/blog/actionable-and-automated-cryptography-thanks-cryptosense, accessed Dec. 6, 2021, 6 pages.

* cited by examiner

ADAPTIVE QUBIT-BASED THRESHOLD HANDSHAKING FOR QUANTUM SAFE PROTOCOLS

TECHNICAL FIELD

The present disclosure relates generally to computer networks, and, more particularly, to adaptive qubit-based threshold handshaking for quantum safe protocols.

BACKGROUND

Quantum computing represents a significant shift in technology. Traditionally, computers have relied on bits that represent the binary states of their constituent transistors (i.e., a '1' or a '0'). In contrast, quantum computers rely on quantum bits, which are referred to as "qubits." Generally, qubits are two-state, quantum mechanical systems that can represent not only the traditional binary values of '1' and '0.' but also the superposition of the two, as well.

Many of the cryptographic protocols in use today were not designed with quantum computing in mind, presenting new challenges for network security. For instance, a quantum computer executing Shor's algorithm with enough qubits could be used to break commonly used public key cryptography protocols, such as Rivest-Shamir-Adelman (RSA), certain variations of Diffie-Hellman key exchange (e.g., elliptic curve, finite field, etc.), and the like. This creates a moving target for security experts, as the encryption protocols that network devices use to encrypt their traffic become increasingly vulnerable to advances in quantum computing.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
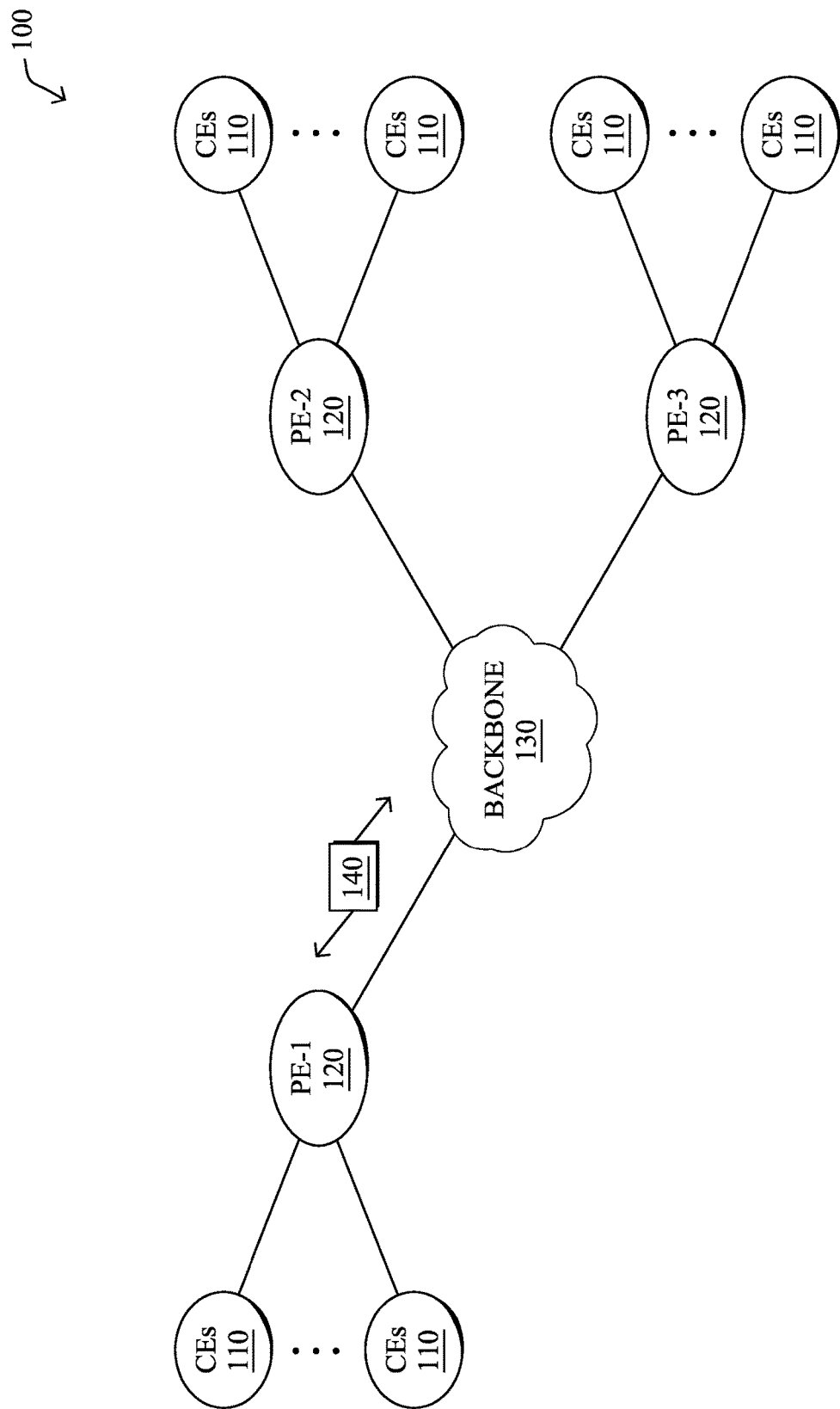
FIGS. 1A-1B illustrate an example communication network.

According to one or more embodiments of the disclosure, a first device in a network receives a quantum computing power metric indicative of a maximum available compute power of quantum computers. The first device receives, from a second device in the network, a listing of cryptographic suites available on the second device. The first device selects, based on the quantum computing power metric, a particular cryptographic suite from among the listing of cryptographic suites available on the second device. The first device sends, to the second device via the network, an indication that the particular cryptographic suite is to be used to encrypt and decrypt traffic exchanged between the first device and the second device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
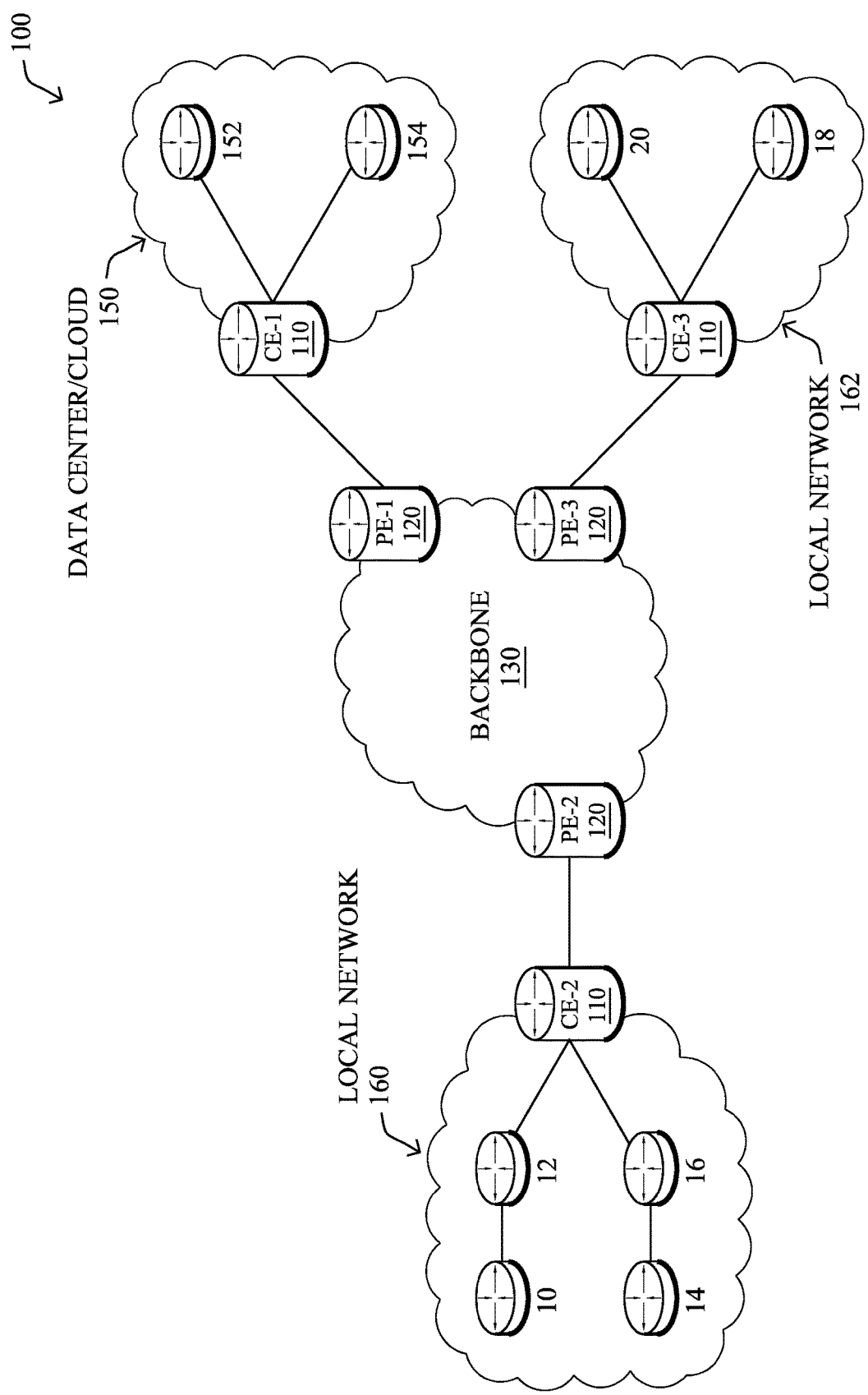

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
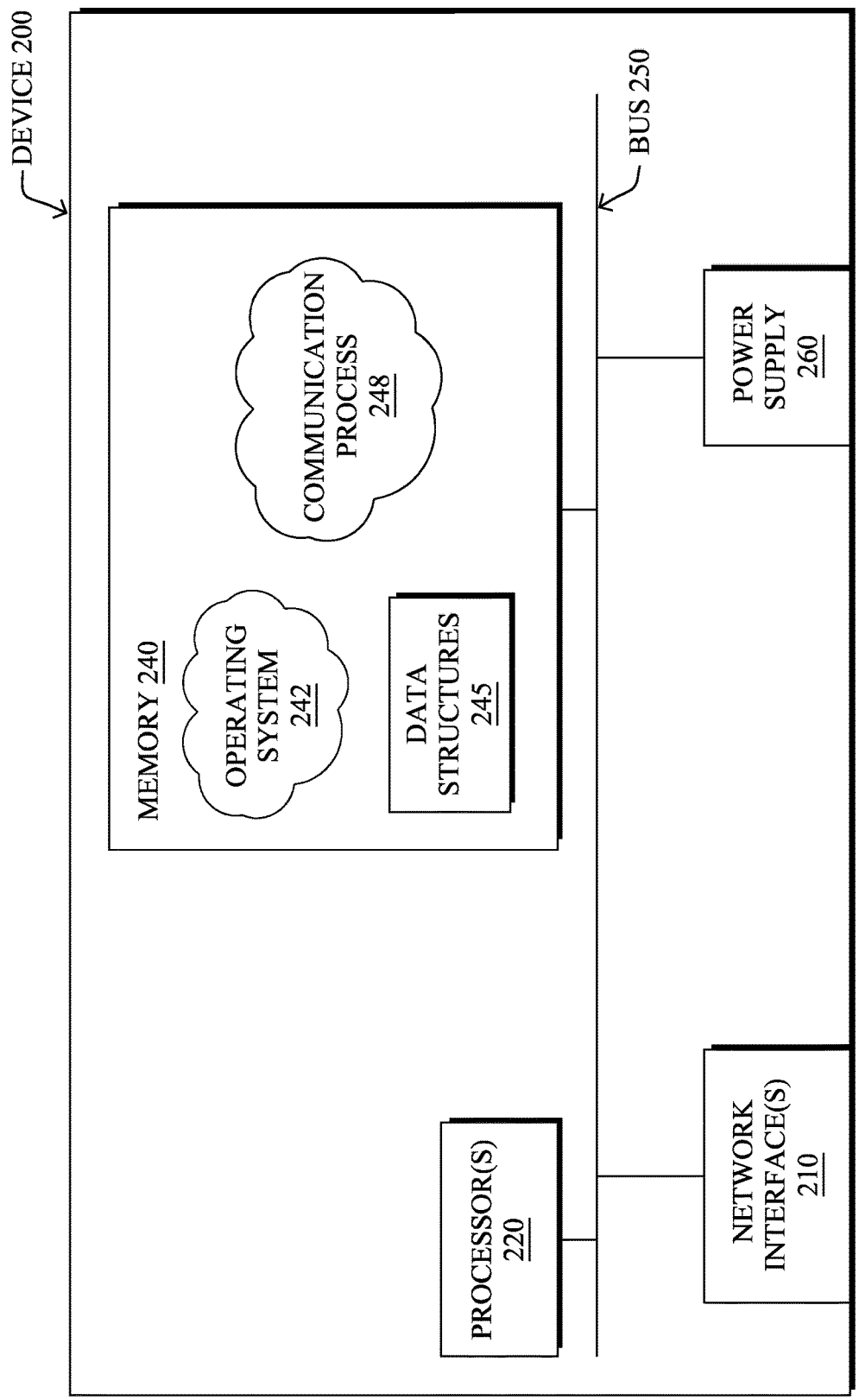
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as Internet of Things (IoT) nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a communication process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, quantum computing represents a significant shift in technology. Traditionally, computers have relied on bits that represent the binary states of their constituent transistors (i.e., a '1' or a '0'). In contrast, quantum computers rely on quantum bits, which are referred to as "qubits." Generally, qubits are two-state, quantum mechanical systems that can represent not only the traditional binary values of '1' and '0.' but also the superposition of the two, as well.

Many of the cryptographic protocols in use today were not designed with quantum computing in mind, presenting new challenges for network security. For instance, a quantum computer executing Shor's algorithm with enough qubits could be used to break commonly used public key cryptography protocols, such as Rivest-Shamir-Adelman (RSA), certain variations of Diffie-Hellman key exchange (e.g., elliptic curve, finite field, etc.), and the like. This creates a moving target for security experts, as the encryption protocols that network devices use to encrypt their traffic become increasingly vulnerable to advances in quantum computing.

To combat the security threat presented by quantum computing, a number of so-called "quantum safe" or "post-quantum" cryptographic protocols have been developed. However, the threat to any given cryptographic suite posed by quantum computing is largely a function of the maximum available compute power of currently-available quantum computers. This means that the protection afforded by many cryptographic protocols (and the suites that implement them) will vary over time, as advances in quantum computing are made.

—Adaptive Qubit-Based Threshold Handshaking for Quantum Safe Protocols—

The techniques herein introduce a handshaking mechanism that allows devices communicating over a network to select which cryptographic suite is to be used to encrypt/decrypt a traffic session between the two devices. In various aspects, the selection may be performed based on an indication of the maximum available compute power of quantum computers, thereby allowing the devices to disregard cryptographic suites/protocols that have become vulnerable over time to quantum computing.

Illustratively, the techniques described herein may be performed by hardware, software, and/or firmware, such as communication process 248, which may include computer executable instructions executed by the processor 220 (or independent processor of interfaces 210) to perform functions relating to the techniques described herein.

Specifically, according to various embodiments, a first device in a network receives a quantum computing power metric indicative of a maximum available compute power of quantum computers. The first device receives, from a second device in the network, a listing of cryptographic suites available on the second device. The first device selects, based on the quantum computing power metric, a particular cryptographic suite from among the listing of cryptographic suites available on the second device. The first device sends, to the second device via the network, an indication that the particular cryptographic suite is to be used to encrypt and decrypt traffic exchanged between the first device and the second device.

Figure 3:
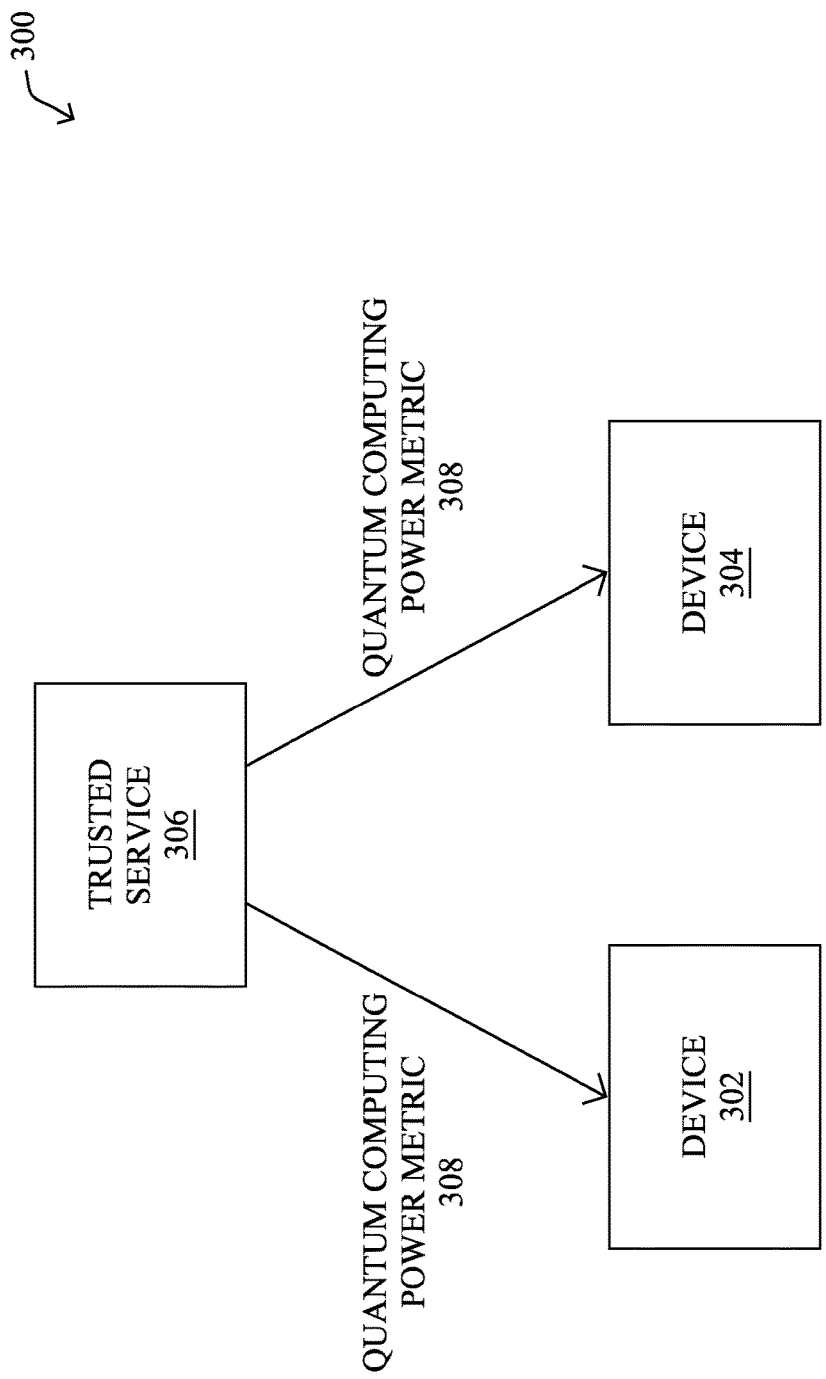
FIG. 3 illustrates an example network that includes two device that are to communicate with one another.

Operationally, FIG. 3 illustrates an example network that includes two device that are to communicate with one another, according to various embodiments. As shown, network 300 may include a first device, device 302, as well as a second device, device 304, that are to communicate with one another. In addition, in various embodiments, network 300 may also include a trusted service 306 that is in communication with either or both of devices 302-304.

Generally, devices 302-304 may be any form of device (e.g., a device 200) capable of communicating over a network, such as network 300. For instance, any of devices 302-304 may include, but are not limited to, mobile devices (e.g., cellular phones, tablets, wearable devices, etc.), personal computing devices (e.g., laptop computers, desktop computers, etc.), IoT devices (e.g., sensors, actuators, controllers, etc.), servers, networking devices (e.g., routers, switches, gateways, firewalls, etc.), or the like.

As a prerequisite for the handshaking mechanism introduced herein, devices 302-304 need some concept of what the currently "best" quantum computers are capable of. To this end, trusted service 306 may send a quantum computing power metric 308 indicative of the maximum compute power currently available for quantum computers. In one embodiment, the maximum computer power may take the form of the maximum number of qubits that can currently be processed by available quantum computers. In another embodiment, the maximum computer power may be the maximum qubit volume (also called the "quantum volume") of available quantum computers, which is a measure of the size of square quantum circuits of a quantum computer. Of course, other computing power metrics could also be used, as well.

Trusted service 306 may send quantum computing power metric 308 to devices 302-304 in a number of ways. In some instances, trusted service 306 may send quantum computing power metric 308 on a push basis, such as at periodic times (e.g., hourly, daily, weekly, etc.). In other instances, trusted service 306 may send quantum computing power metric 308 in response to a request to do so, such as based on requests from devices 302-304 to do so (e.g., on a pull basis), a request received from a user interface, or a request from another system to do so. In one embodiment, trusted service 306 may also send quantum computing power metric 308 via secure connections to devices 302-304, thereby ensuring that a malicious actor does not inject a quantum computing power metric 308 that is too low into the system.

Figure 4:
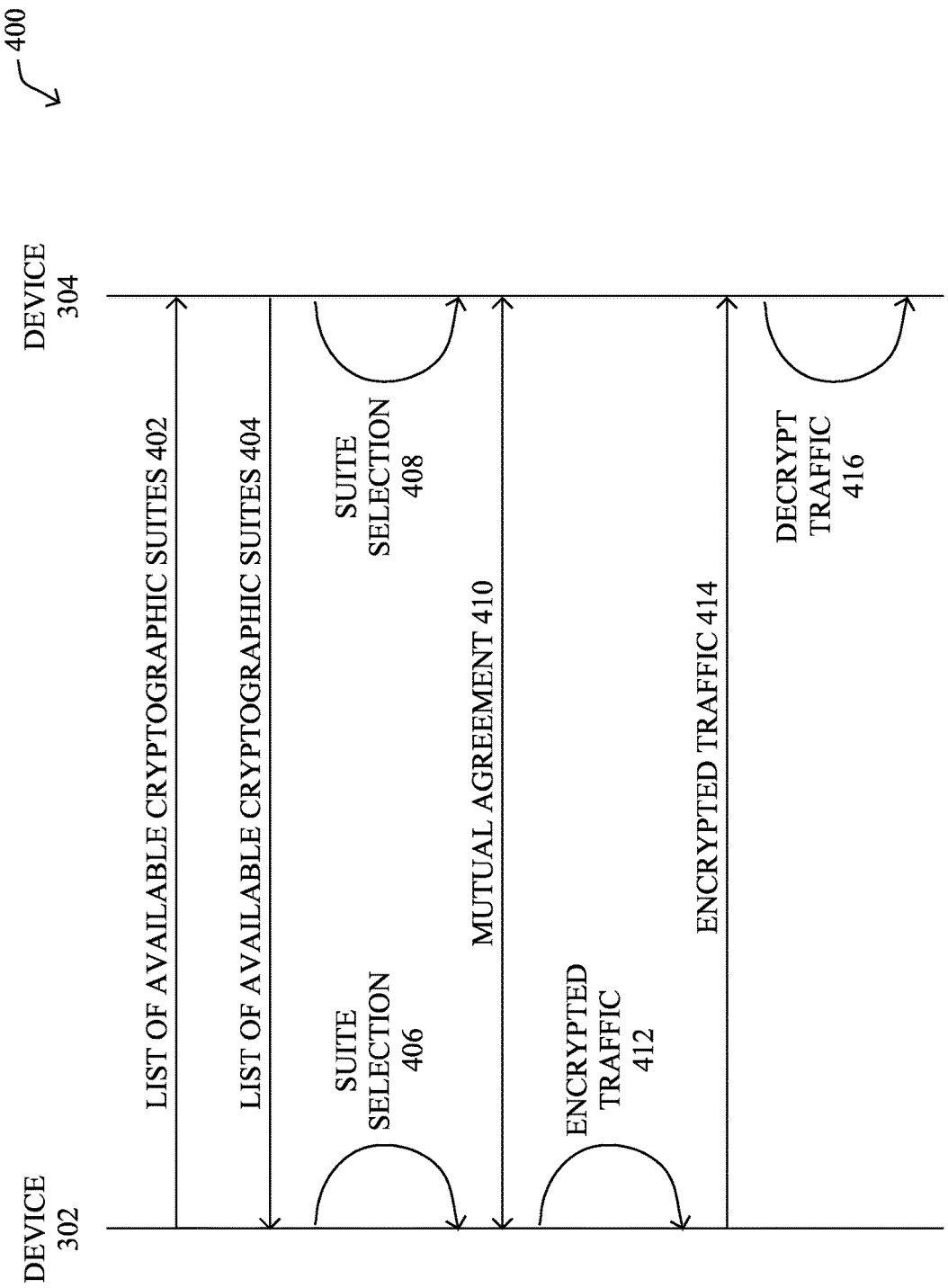
FIG. 4 illustrates an example diagram of a handshake between the devices of FIG. 3.

FIG. 4 illustrates an example diagram of a handshake 400 between the devices of FIG. 3, in various embodiments. Continuing the example of FIG. 3, assume now that device 302 is to send data to device 304 via network 300. To do so, device 302 may send a request to device 304 to establish an encrypted session between devices 302-304. In various embodiments, the handshake mechanism introduced herein may be integrated into the handshake of an existing network security protocol, such as Transport Layer Security (TLS), or performed prior to it.

As shown, device 302 may send a list 402 of the cryptographic suites available for use by device 302 to device 304 as part of handshake 400. Such a list may be included in an initial handshake request sent by device 302 to device 304 or may be sent separately. In some embodiments, list 402 may also be sent in conjunction with an indication as to the characteristics of the data that device 302 wishes to send to device 304. For instance, such characteristics may indicate the level of confidentiality or privacy of the data to be sent, an amount of time that the data is considered to be confidential or private, and/or any other information that device 304 can use to select an appropriate cryptographic suite to use.

In a similar manner, device 304 may also a list 404 of its own available cryptographic suites to device 302 via the network. As with list 402, list 404 may also be sent in conjunction with the characteristics of any data that device 304 intends to send to device 302 via the network.

According to various embodiments, device 302 may make a selection 406 of its available cryptographic suites (e.g., those listed in list 402) to use as part of an encrypted traffic session with device 304 taking into account any or all of the following factors:

The quantum computing power metric 308 send to device 302 by trusted service 306

The list 404 of cryptographic suites available on device 304

Quantum computing power thresholds associated with the cryptographic suites available to devices 302-304

The characteristics of the data to be sent by each of devices 302-304

The resource requirements of the cryptographic suites

Etc.

First and foremost, the particular cryptographic suite selected by device 302 must be available to both of devices 302-304, so that the receiver will be able to properly decrypt the traffic encrypted using that suite/protocol. Thus, as part of suite selection 406, device 302 may make a comparison between the list 404 of cryptographic suites available on device 304 to its own available cryptographic suites. In turn, device 302 may exclude any of those cryptographic suites from further consideration that are not mutually available to both of devices 302-304.

In various embodiments, suite selection 406 may also entail device 302 comparing the quantum computing thresholds of these candidate cryptographic suites to quantum computing power metric 308. As would be appreciated, different cryptographic suites/protocols may become vulnerable to quantum computing over time, as the capabilities of quantum computers increase. Thus, one criterion that device 302 may impose when making suite selection 406 is that the associated threshold of the selected cryptographic suite be greater than that of quantum computing power metric 308. By way of example, say that a given cryptographic suite is considered vulnerable to quantum computers that use more than 512 qubits. If the maximum number of qubits currently achievable by any quantum computer (i.e., quantum computing power metric 308) is 256, then that cryptographic suite/protocol is eligible for use for the encrypted traffic session between devices 302-304. Conversely, if quantum computing power metric 308 is greater than the threshold associated with that particular suite/protocol, device 302 may exclude it from being eligible for use.

It should also be noted that while suite selection 406 may take into account quantum computing power metric 308, this can also be performed by either or both of devices 302-304 before they send their respective lists 402-404 to one another. For instance, if device 302 determines that its cryptographic suite A is now considered vulnerable based on the latest quantum computing power metric 308, it may simply exclude it from further consideration and exclude it from list 402, as well.

In various embodiments, suite selection 406 by device 302 may also take into account the characteristics of the data to be sent by either or both of devices 302-304 and/or the resource requirements of the eligible cryptographic suites. Indeed, while a naïve embodiment may simply entail selecting the suite with the highest threshold that is mutually available to both of devices 302-304, doing so may also lead to unnecessary resource consumption in terms of compute, memory, or even computation time. Thus, suite selection 406 may also take into account these factors, to select what it considers the 'best' cryptographic suite for the particular traffic session with device 304.

By way of example, consider the case in which device 304 is an IoT actuator that is controlled by device 302 (e.g., a stamping machine in a factory, etc.). In such a case, device 302 may send control commands to device 304 via the network, thereby causing device 304 to start or stop its operation based on feedback received from device 304. Such control commands are short lived in that their relevancy rapidly decreases, unlike more permanent data such as personally identifiable information (PII) data, such as Social Security numbers. In addition, the control loop implemented by devices 302-304 may be somewhat delay intolerant, meaning that cryptographic suites that take greater than a threshold amount of time to encrypt and decrypt the traffic would be unsuitable for the task. Thus, in this case, device 302 may select a cryptographic suite that affords faster encryption/decryption times than that of another with a higher quantum computing power threshold, since it will still afford the encrypted traffic protection from quantum computers.

In some embodiments, device 304 may also perform its own suite selection 408 in a manner similar to the above with respect to suite selection 406 by device 302.

Once suite selection 406 and/or suite selection 408 completes, devices 302-304 may obtain mutual agreement 410. To do so, device 302 and or device 304 may send an indication of the particular cryptographic suite selected via suite selection 406 and/or its own suite selection 408 to the other device. In one embodiment, mutual agreement 410 may be achieved by pre-agreeing to use the cryptographic suite selected first by either of devise 302-304. For instance, if device 302 selects a cryptographic suite from among those listed in list 404 and send an indication of this to device 304, device 304 may simply agree to use that cryptographic suite.

In another embodiment, devices 302-304 may select a set of eligible cryptographic suites that would satisfy their respective selection criteria. In turn, mutual agreement 410 may be achieved by either of devices 302-304 making a random selection from among those suitable cryptographic suites. Regardless of the specific approach taken to reach agreement, mutual agreement 410 may be achieved in part by one of devices 302-304 sending a confirmation of the selection to the other device.

At this point, devices 302-304 have agreed to use a particular cryptographic suite/protocol in their traffic session. In one embodiment, device 302 and/or device 304 may log information regarding this agreement, thereby creating an audit trail over time regarding which cryptographic suite was selected for a given session, as well as potentially the factors used to make the selection, as well (e.g., the quantum computing power metric 308 at the time, etc.). In addition, in one embodiment, devices 302-304 may also cache an indication of the mutually-agreed upon selection, so that the selected cryptographic suite can also be used for one or more future sessions, as well. In such a case, the cached selection may also have a defined validity to it, such as for only a limited amount of time or number of sessions, before the handshake process needs to be repeated between devices 302-304.

Now, say that device 302 is to send data to device 304. In such a case, device 302 may perform an encryption 412 of its traffic to be sent to device 304 using the mutually agreed upon cryptographic suite. Once the traffic has been encrypted, device 302 may send the resulting encrypted traffic 414 to device 304 via the network. In turn, device 304 may perform a decryption 416 of the encrypted traffic 414 using the selected cryptographic suite.

As would be appreciated, while the techniques herein are described with respect to a pair of devices in a network agreeing on a cryptographic suite to use that takes into account the current computing power of quantum computers, further embodiments also provide for the techniques herein to be used by three or more devices. For instance, the techniques herein could also be used encrypt traffic that is to be sent via multicast or broadcast to any number of receiving devices.

Thus, the techniques introduced herein provide a cryptographic suite selection mechanism that can adapt to the ever-increasing capabilities of quantum computers. This ensures that the suite used for any given encrypted traffic session remains protected from being broken by current quantum computers.

Figure 5:
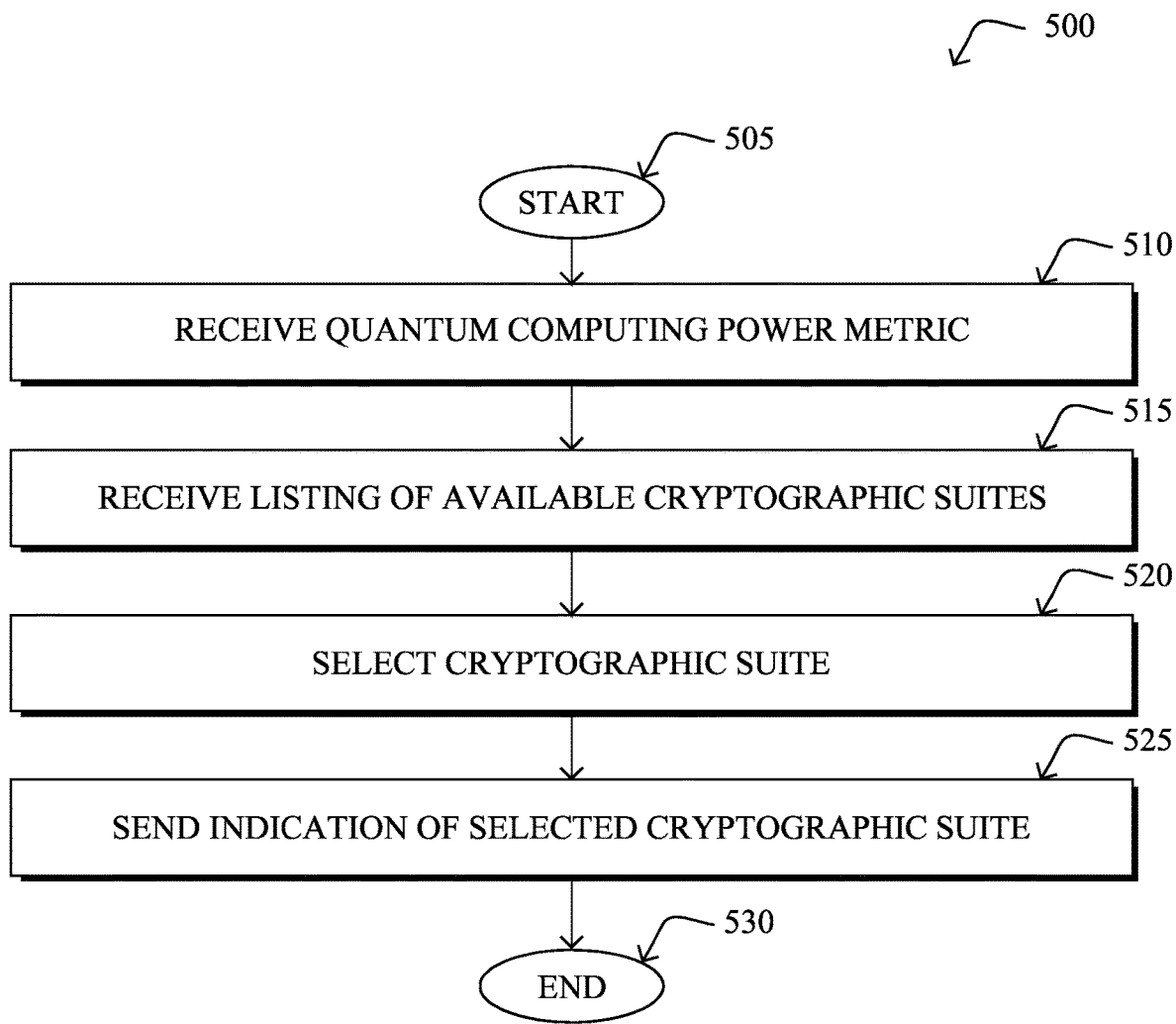
FIG. 5 illustrates an example simplified procedure for adaptive qubit-based threshold handshaking for quantum safe protocols.

FIG. 5 illustrates an example simplified procedure for adaptive qubit-based threshold handshaking for quantum safe protocols, in accordance with one or more embodiments described herein. In various embodiments, procedure 500 may be performed by a device in a network (e.g., a device 200 executing communication process 248). As shown, procedure 500 may start at step 505 and continue on to step 510 where, as described in greater detail above, the device may receive a quantum computing power metric indicative of a maximum available compute power of quantum computers. In some embodiments, the maximum available compute power of quantum computers comprises a maximum qubit volume usable by any quantum computer currently available. In further embodiments, the maximum available compute power of quantum computers comprises a maximum number of qubits usable by any quantum computer currently available. In one embodiment, the device receives the quantum computing power metric via a secure connection with a remote service. In various embodiments, the device and/or the second device may be networking devices such as routers, switches, firewalls, or the like. In other embodiments, at least one of the first device and the second device comprises a personal computing device, a mobile device, a server, a sensor, an actuator, or any other device capable of communicating via a network.

At step 515, as detailed above, the device may receive, from a second device in the network, a listing of cryptographic suites available on the second device. In various embodiments, each of the listing of cryptographic suites has an associated quantum computing power threshold above which that cryptographic suite is considered vulnerable to malicious decryption.

At step 520, the device may select, based on the quantum computing power metric, a particular cryptographic suite from among the listing of cryptographic suites available on the second device, as described in greater detail above. In some embodiments, the device may do so by comparing the associated quantum computing power threshold of each of the listing of cryptographic suites to the quantum computing power metric received by the device. In further embodiments, the device selects the particular cryptographic suite based in part on an amount of time that contents of the traffic is considered to be confidential.

At step 525, as detailed above, the device may send, to the second device via the network, an indication that the particular cryptographic suite is to be used to encrypt and decrypt traffic exchanged between the first device and the second device. In various embodiments, the device may also form encrypted traffic by encrypting at least a portion of the traffic using the particular cryptographic suite and transmitting the encrypted traffic to the second device via the network. In turn, the second device uses the particular cryptographic suite to decrypt the encrypted traffic based in part on the indication sent by the device. In one embodiment, the device may also cache an association between the second device and the particular cryptographic suite for use in a future traffic session.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for adaptive qubit-based threshold handshaking for quantum safe protocols, it is to be understood that various other adaptations and modifications may be made within the spirit and scope of the embodiments herein. For example, while certain embodiments are described herein with respect to using certain cryptographic protocols, the models are not limited as such and may be used for other types of predictions, in other embodiments. In addition, while certain networking protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:
1. A method comprising:
receiving, at a first device in a network, a quantum computing power metric indicative of a maximum available compute power of quantum computers;

receiving, at the first device and from a second device in the network, a listing of cryptographic suites available on the second device;

selecting, by the first device and based on the quantum computing power metric, a particular cryptographic suite from among the listing of cryptographic suites available on the second device; and sending, by the first device and to the second device via the network, an indication that the particular cryptographic suite is to be used to encrypt and decrypt traffic exchanged between the first device and the second device.

2. The method as in claim 1, further comprising:
caching, by the first device, an association between the second device and the particular cryptographic suite for use in a future traffic session.

3. The method as in claim 1, further comprising:
forming, by the first device, encrypted traffic by encrypting at least a portion of the traffic using the particular cryptographic suite; and
transmitting, by the first device, the encrypted traffic to the second device via the network, wherein the second device uses the particular cryptographic suite to decrypt the encrypted traffic based in part on the indication sent by the first device.

4. The method as in claim 1, wherein the maximum available compute power of quantum computers comprises a maximum qubit volume usable by any quantum computer currently available.

5. The method as in claim 1, wherein the maximum available compute power of quantum computers comprises a maximum number of qubits usable by any quantum computer currently available.

6. The method as in claim 1, wherein each of the listing of cryptographic suites has an associated quantum computing power threshold above which that cryptographic suite is considered vulnerable to malicious decryption.

7. The method as in claim 6, wherein selecting the particular cryptographic suite comprises:
comparing the associated quantum computing power threshold of each of the listing of cryptographic suites to the quantum computing power metric received by the first device.

8. The method as in claim 1, wherein the first device receives the quantum computing power metric via a secure connection with a remote service.

9. The method as in claim 1, wherein the first device selects the particular cryptographic suite based in part on an amount of time that contents of the traffic is considered to be confidential.

10. The method as in claim 1, wherein the first device and the second device comprise network routers.

11. An apparatus, comprising:
one or more network interfaces;
a processor coupled to the one or more network interfaces and configured to execute one or more processes; and
a memory configured to store a process that is executable by the processor, the process when executed configured to:
receive a quantum computing power metric indicative of a maximum available compute power of quantum computers;
receiving, from a remote device in a network, a listing of cryptographic suites available on the remote device;
select, based on the quantum computing power metric, a particular cryptographic suite from among the listing of cryptographic suites available on the remote device; and
send, to the remote device via the network, an indication that the particular cryptographic suite is to be used to encrypt and decrypt traffic exchanged between the apparatus and the remote device.

12. The apparatus as in claim 11, wherein the process when executed is further configured to:
cache an association between the remote device and the particular cryptographic suite for use in a future traffic session.

13. The apparatus as in claim 11, wherein the process when executed is further configured to:
form encrypted traffic by encrypting at least a portion of the traffic using the particular cryptographic suite; and
transmit the encrypted traffic to the remote device via the network, wherein the remote device uses the particular cryptographic suite to decrypt the encrypted traffic based in part on the indication sent by the apparatus.

14. The apparatus as in claim 11, wherein the maximum available compute power of quantum computers comprises a maximum qubit volume usable by any quantum computer currently available.

15. The apparatus as in claim 11, wherein the maximum available compute power of quantum computers comprises a maximum number of qubits usable by any quantum computer currently available.

16. The apparatus as in claim 11, wherein each of the listing of cryptographic suites has an associated quantum computing power threshold above which that cryptographic suite is considered vulnerable to malicious decryption.

17. The apparatus as in claim 16, wherein the apparatus selects the particular cryptographic suite by:
comparing the associated quantum computing power threshold of each of the listing of cryptographic suites to the quantum computing power metric received by the apparatus.

18. The apparatus as in claim 11, wherein the apparatus receives the quantum computing power metric via a secure connection with a remote service.

19. The apparatus as in claim 11, wherein the apparatus selects the particular cryptographic suite based in part on an amount of time that contents of the traffic is considered to be confidential.

20. A tangible, non-transitory, computer-readable medium storing program instructions that cause a first device in a network to execute a process comprising:
receiving, at the first device in the network, a quantum computing power metric indicative of a maximum available compute power of quantum computers;
receiving, at the first device and from a second device in the network, a listing of cryptographic suites available on the second device;
selecting, by the first device and based on the quantum computing power metric, a particular cryptographic suite from among the listing of cryptographic suites available on the second device; and
sending, by the first device and to the second device via the network, an indication that the particular cryptographic suite is to be used to encrypt and decrypt traffic exchanged between the first device and the second device.

* * * * *

UNITED STATES PATENT AND TRADEMARK OFFICE
CERTIFICATE OF CORRECTION

PATENT NO. : 12,231,548 B2
APPLICATION NO. : 18/078223
DATED : February 18, 2025
INVENTOR(S) : Ashish Kundu et al.

It is certified that error appears in the above-identified patent and that said Letters Patent is hereby corrected as shown below:

In the Specification

Column 1, Line 19 please amend as shown:
represent not only the traditional binary values of '1' and '0,'

Column 5, Line 27 please amend as shown:
values of '1' and '0,' but also the superposition of the two, Signed and Sealed this
Twentieth Day of May, 2025

Coke Morgan Stewart
*Acting Director of the United States Patent and Trademark Office*